US009025610B2

(12) United States Patent
Qu

(10) Patent No.: US 9,025,610 B2
(45) Date of Patent: May 5, 2015

(54) METHOD FOR MACHINE TYPE COMMUNICATION GROUP SELECTING PACKET DATA NETWORK GATEWAY, AND MOBILE MANAGEMENT NETWORK ELEMENT

(75) Inventor: Aiyan Qu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 157 days.

(21) Appl. No.: 13/581,856

(22) PCT Filed: Apr. 19, 2011

(86) PCT No.: PCT/CN2011/072975
§ 371 (c)(1),
(2), (4) Date: Aug. 30, 2012

(87) PCT Pub. No.: WO2011/140884
PCT Pub. Date: Nov. 17, 2011

(65) Prior Publication Data
US 2013/0070775 A1    Mar. 21, 2013

(30) Foreign Application Priority Data

May 10, 2010 (CN) .......................... 2010 1 0169857

(51) Int. Cl.
| H04W 4/00 | (2009.01) |
| H04M 15/00 | (2006.01) |
| H04L 12/14 | (2006.01) |
| H04W 4/24 | (2009.01) |
| H04L 12/24 | (2006.01) |
| H04W 88/16 | (2009.01) |

(52) U.S. Cl.
CPC .............. *H04M 15/66* (2013.01); *H04W 4/005* (2013.01); *H04L 12/1407* (2013.01); *H04L 41/0893* (2013.01); *H04W 4/24* (2013.01); *H04W 88/16* (2013.01)

(58) Field of Classification Search
None
See application file for complete search history.

(56) References Cited

U.S. PATENT DOCUMENTS

2011/0128911 A1* 6/2011 Shaheen ...................... 370/328

OTHER PUBLICATIONS

International Search Report for PCT/CN2011/072975 dated Jul. 21, 2011.

* cited by examiner

Primary Examiner — Michael J Moore, Jr.
Assistant Examiner — Ayanah George
(74) Attorney, Agent, or Firm — Banner & Witcoff, Ltd.

(57) ABSTRACT

The present invention provides a method for a MTC group selecting a Packet Data Network Gateway (PGW) and a mobility management network element. After a MTC UE in the MTC group attaches for the first time, PGW information corresponding to the selected PGW is stored in a subscriber database; and when other MTC UEs in the MTC group attach, the PGW corresponding to the PGW information stored in the subscriber database is directly used as their own PGW. With the method of the present invention, it is guaranteed that the PGWs selected by multiple MTC UEs belonging to the same MTC group are the same PGW, thereby guaranteeing that the maximum flow and charging of each MTC group are effectively limited subsequently.

18 Claims, 5 Drawing Sheets

METHOD FOR MACHINE TYPE COMMUNICATION GROUP SELECTING PACKET DATA NETWORK GATEWAY, AND MOBILE MANAGEMENT NETWORK ELEMENT

TECHNICAL FIELD

The present invention relates to Machine Type Communication (MTC) technology, and particularly, to a method for a MTC group selecting a packet data network gateway and a mobility management network element.

BACKGROUND OF THE RELATED ART

Machine To Machine (M2M) communication is also called as machine type communication, which is the communication between a terminal and an application server typically, and the terminal is called as a MTC User Equipment (MTC UE) and the application server is called as a MTC Server. An action of the MTC UE in the M2M communication is restrained by service subscription data, and the MTC Server manages the MTC UE in the M2M communication according to the service subscription data.

In the 2G/3G Long Term Evolution (LTE) access, the M2M communication mainly takes a Packet Service (PS) network as a bottom layer bearer network, which implements service layer communication between the MTC UE and MTC Server. FIG. 1 is a schematic diagram of framework of an M2M communication entity accessing an Evolved Packet System (EPS) in the related art.

In FIG. 1, the bottom layer bearer network includes: an Evolved Universal Terrestrial Radio Access Network (E-UTRAN), a Mobility Management Entity (MME), a Serving Gateway (S-GW or SGW), a Packet Data Network Gateway (PDN GW, P-GW or PGW), a Home Subscriber Server (HSS) and a Policy and Charging Rules Function (PCRF) entity. Wherein, a major network element of the E-UTRAN is an Evolved NodeB (eNodeB).

In FIG. 1, the MTC UE gains access to an EPS network through the E-UTRAN (eNodeB), and after an IP address is allocated, an IP channel can be established between the MTC UE and MTC Server, thereby implementing upper layer service communication between the MTC UE and MTC Server. The IP channel established between the MTC UE and MTC Server is a logical IP channel of which a physical path goes through the eNodeB, S-GW and P-GW.

Currently, one mode for implementing the M2M communication is to establish one service layer interface protocol on the IP channel between the MTC UE and MTC Server, and the interaction of service data is performed between the MTC UE and MTC Server through the service layer interface protocol. Meanwhile, the MTC Server also implements control on the MTC UE through the service layer protocol.

FIG. 2 is a flow diagram of a MME allocating a PGW to a MTC UE in the existing process of implementing the M2M communication by establishing one service layer interface protocol on an IP channel between the MTC UE and MTC Server, and as shown in FIG. 2, following steps are mainly included.

In step 200, the MTC UE initiates an attach request to the MME.

In step 201, the MME receives the attach request and sends an Update location request to a HSS, and the HSS downloads the subscription data of the MTC UE from the MME through an Update location response, wherein the subscription data part used for M2M access control is included.

In step 202, the MME selects an appropriate SGW and PGW for the MTC UE according to the subscription data returned by the HSS.

Currently, the HSS mainly uses the following two modes to indicate the MME how to acquire a PGW address.

The first mode: the HSS appoints one Access Point Name (APN) and one PGW specific address in the Update location response. With the first mode, the HSS appoints one PGW specific address (the APN and PGW address) of a home network, and the MME acquires the PGW of the home network definitely according to the PGW address indicated by the HSS, that is, the HSS replaces the MME to select the PGW.

The second mode: the HSS appoints one APN and one indication used for indicating the MME whether to select the PGW of a home network or visited network in the Update location response. With the second mode, the HSS indicates the MME to select the PGW, and a mechanism of the MME selecting the PGW is: the MME extending the APN into a domain name in the form of: APN.MNC.MCC.XXYY, and then requesting a Domain Name Server (DNS) to analyze the domain name into one PGW address. Wherein, a Mobile Network Code (MNC) is used to identify one specific mobile network, and the visited network and home network may have different mobile network codes; a Mobile Country Code (MCC) is used to identify a country to which the mobile network belongs; XXYY is a service type name, e.g. GPRS, which indicates that the APN is one PGW which provides a GPRS service type.

If the HSS uses the second mode to indicate the MME how to acquire the PGW address, and the HSS indicates that the MME is required to allocate the PGW of the home network, thus, the HSS needs to provide one APN Operator Identifier (APN-OI), and the APN-OI is in the form of a word string APN.MNC.MCC; after receiving the indication from the HSS, the MME replaces the corresponding part in the domain name APN.MNC.MCC.XXYY extended by the APN with the APN-OI, and then according to the domain name, it can request the DNS of the home network to analyze the PGW address of the home network.

If the HSS uses the second mode to indicate the MME how to acquire the PGW address, and the HSS indicates the MME to allocate the PGW of the visited network, thus, the MME generates the domain name in the form of APN.MNC.MCC.XXYY according to its own mobile network code, and requests the DNS of the local network to analyze the PGW address of a local network according to the domain name.

Compared with the second mode, in the first mode, the APN does not include an Operator Identifier (OI) and the above "MNC.MCC" part.

In step 203, the MME sends a Create bearer request to the selected SGW/PGW to request the SGW/PGW to create an appropriate bearer for the MTC UE.

In step 204, if the PGW needs to acquire policy data from PCC to establish the appropriate bearer, the PGW interacts with the PCC to obtain a PCC policy.

In step 205, the PGW creates the bearer for the MTC UE, and returns a Create bearer response.

In step 206, the MME sends an attach response to the MTC UE.

Due to the particularity of the M2M communication, in practical applications, a plurality of MTC UEs may have identical management attributes, therefore, these MTC UEs which have the identical management attributes can constitute one MTC group, and the same access control can be executed on one MTC group, such as access time control, access times control and access region restriction and so on.

With regard to the MTC UEs under management of the MTC group, during the charging, the maximum flow of a certain MTC group may be required to be limited, and a data gateway is required to generate charging data according to the MTC group. According to the requirement, it is required to allocate each MTC UE in the same MTC group to the same PGW. However, in the related art, since the allocation of PGW to the MTC UE is indicated by the HSS and obtained according to analyzing the APN, therefore, it fails to guarantee that the MTC UEs in the same MTC group are allocated to the same PGW, thereby failing to guarantee that the maximum flow and charging of each MTC group are effectively limited.

In the related art, the MME acquires a group identifier of the MTC group to which a MTC UE belongs, and allocates the same PGW to MTC UEs with the same group identifier. However, when the MTC UE attaches, if other MTC UEs in the MTC group to which the MTC UE belongs do not attach to the same MME, thus, according to the existing method, a PDN-GW address can only be statically configured in the HSS, otherwise they fails to be selected on the same PGW. Moreover, if the MTC UE is in a roaming scenario, MMEs to which the MTC UEs attach may be different in the group, thus according to that the PGWs analyzed by the same APN are different, using the MME to select the same PGW for the MTC UEs in the MTC group is also inappropriate.

SUMMARY OF THE INVENTION

In view of this, the main objective of the present invention is to provide a method for a MTC group selecting a packet data network gateway as well as a mobility management network element, which can guarantee that MTC UEs of the same MTC group are allocated to the same PGW, thereby guaranteeing that the maximum flow and charging of each MTC group are effectively limited.

In order to achieve the foregoing objectives, the technical scheme of the present invention is implemented as follows.

A method for a MTC group selecting a packet data network gateway comprises:

after a MTC UE in a Machine Type Communication (MTC) group attaches for the first time, taking PGW information corresponding to a selected Packet Data Network Gateway (PGW) as group PGW information of the MTC group to be stored in a subscriber database;

when other MTC UEs in the MTC group attach, using the PGW corresponding to the PGW information stored in the subscriber database as their own PGW directly.

Before storing the PGW information corresponding to the selected PGW in the subscriber database, the method further comprises:

a mobility management network element checking that an attach request initiated by the MTC UE is a first attachment in the MTC group.

Storing the PGW information corresponding to the selected PGW in the subscriber database comprises:

the mobility management network element sending a notification message including the PGW information corresponding to the selected PGW to the subscriber database;

the subscriber database taking the received PGW information corresponding to the selected PGW as the group PGW information of the MTC group to be stored locally.

The notification message further includes Access Point Name (APN) information and group identifier information.

Before using the PGW corresponding to the PGW information stored in the subscriber database as their own PGW, the method further comprises:

the mobility management network element checking that attach requests initiated by said other MTC UEs are not first attachments in the MTC group.

Using the PGW corresponding to the PGW information stored in the subscriber database as their own PGW comprises:

in an attachment process of said other MTC UEs in the MTC group, the mobility management network element sending a Update location request to the subscriber database;

the subscriber database sending an Update location response message to the mobility management network element, and including the group PGW information of the MTC group stored by the subscriber database in the Update location response message; and after obtaining the group PGW information of the MTC group, the mobility management network element not selecting the PGW for said other MTC UEs any more, and using the PGW corresponding to the obtained group PGW information of the MTC group as the PGW of said other MTC UEs directly.

The Update location request includes group identifier information of the MTC group; or, the Update location request does not include the group identifier information of the MTC group, and the method further comprises: the subscriber database explaining the group identifier information of the MTC group.

The Update location response message further includes APN information.

When two or more than two MTC UEs initiate the first attachments simultaneously in the MTC group, the method further comprises:

the subscriber database judging whether the group PGW information obtained by MTC UEs initiating the first attachments simultaneously is identical, if yes, discarding rest PGW information except PGW information obtained for the first time, the subscriber database sending a notification response message to the mobility management network element, and this procedure ending;

if no, the subscriber database sending a Cancel location message to the mobility management network element, the Cancel location message including identifier information used for indicating that rest MTC UEs initiating the first attachments simultaneously except the MTC UE obtaining the PGW information for the first time are required to attach again; according to a received identifier information indication, the mobility management network element sending detach request messages to the rest MTC UEs initiating the first attachments simultaneously, and including identifier information used for indicating that the rest MTC UEs initiating the first attachments simultaneously are required to attach again in the detach request message; and the rest MTC UEs initiating the first attachments simultaneously executing detachment and initiating the attachment process again according to the identifier information.

When the stored group PGW information changes, the method further comprises:

a mobility management network element informing the PGW corresponding to the group PGW information of an affected bearer identifier, and the PGW deactivating a corresponding bearer.

The mobility management network element informing the PGW corresponding to the group PGW information of the affected bearer identifier, and the PGW deactivating the corresponding bearer specifically comprises:

the subscriber database inserting subscription data into the mobility management network element;

when the mobility management network element determines that the group PGW information is changed and determines an affected bearer of a corresponding PGW, sending the notification message to the PGW corresponding to the group PGW information, and including the affected bearer identifier in the notification message; and the PGW corresponding to the group PGW information initiating a deactivation procedure for the affected bearer.

The PGW information is an IP address of PGW or a PGW identifier.

In an Evolved Packet System (EPS) network, the mobility management network element is a Mobility Management Entity (MME), and the subscriber database is a Home Subscriber Server (HSS);

in a GPRS network, the mobility management network element is a Serving General Packet Radio Service (GPRS) Support Node (SGSN), and the subscriber database is a Home Location Register (HLR).

A mobility management network element is configured to: select a PGW in a first attachment of a MTC UE in a MTC group, and take PGW information corresponding to the selected PGW as group PGW information of the MTC group to which the MTC UE attaching for the first time belongs, and send to a subscriber database;

when other MTC UEs in the MTC group attach, use the PGW corresponding to the group PGW information from the subscriber database directly as the PGW of said other MTC UEs in the MTC group.

The mobility management network element is further configured to: receive subscription information from the subscriber database, when determining that the group PGW information is changed, and determining an affected bearer of a corresponding PGW, send a notification message to the PGW, including an affected bearer identifier in the notification message.

In an EPS network, the mobility management network element is a MME;

in a GPRS network, the mobility management network element is a SGSN.

It can be seen from the above technical scheme provided by the present invention, after the MTC UE in the MTC group attaches for the first time, the PGW information corresponding to the selected PGW is stored in the subscriber database; and when other MTC UEs in the MTC group attach, the PGW corresponding to the PGW information stored in the subscriber database is directly used as their own PGWs. With the method of the present invention, it is guaranteed that the PGWs selected by multiple MTC UEs belonging to the same MTC group are the same PGW, thereby guaranteeing that the maximum flow and charging of each MTC group are effectively limited subsequently.

PREFERRED EMBODIMENTS OF THE PRESENT INVENTION

Figure 1:
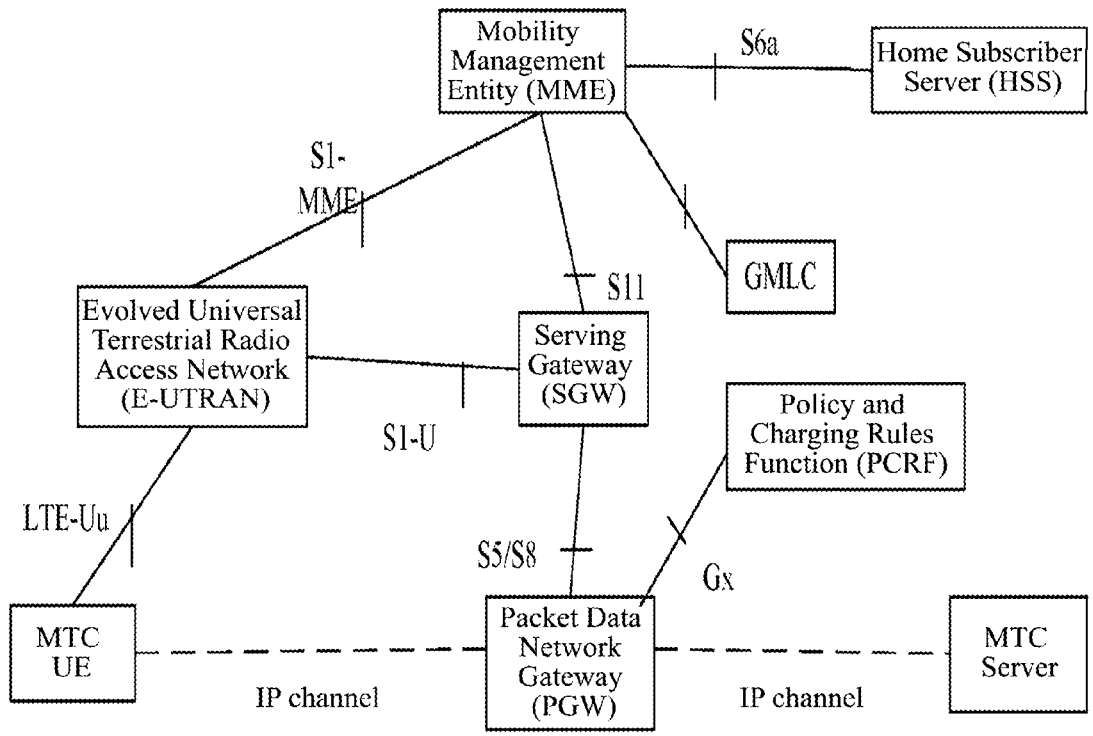
FIG. 1 is a schematic diagram of framework for an M2M communication entity accessing an EPS in the related art.
Figure 2:
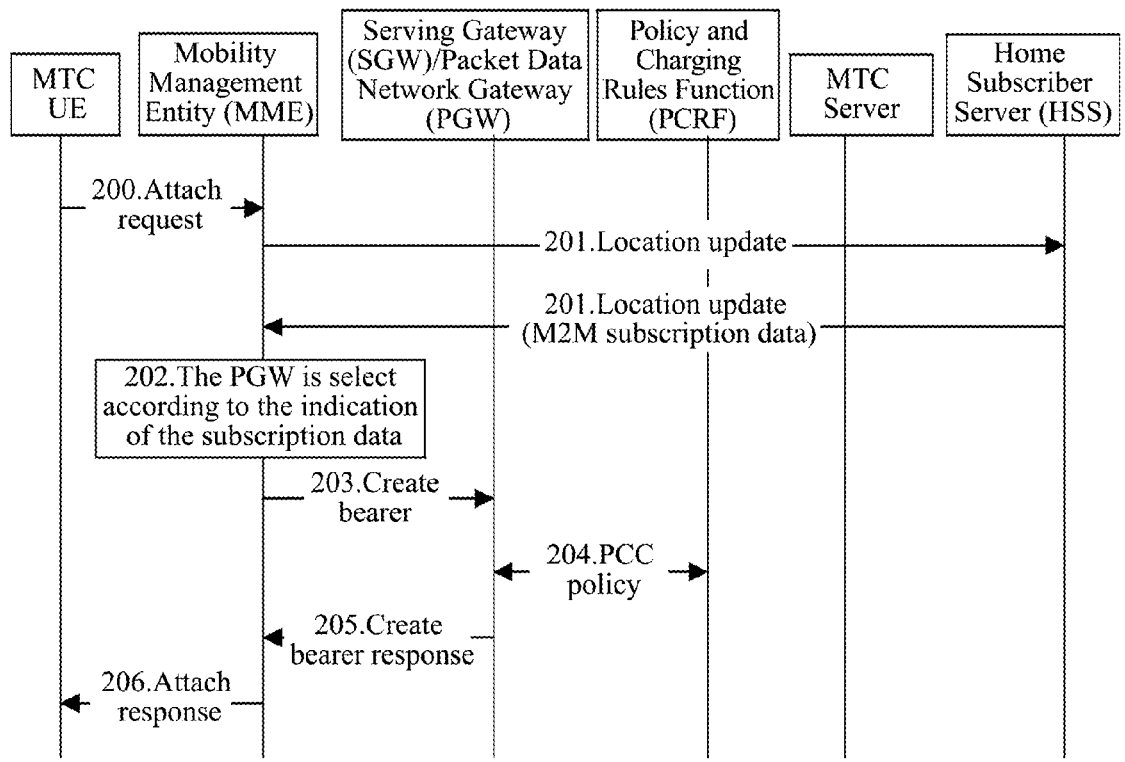
FIG. 2 is a flow diagram of a MME allocating a PGW to a MTC UE in the existing process of implementing the M2M communication through a mode of establishing one service layer interface protocol on an IP channel between the MTC UE and MTC Server.
Figure 3:
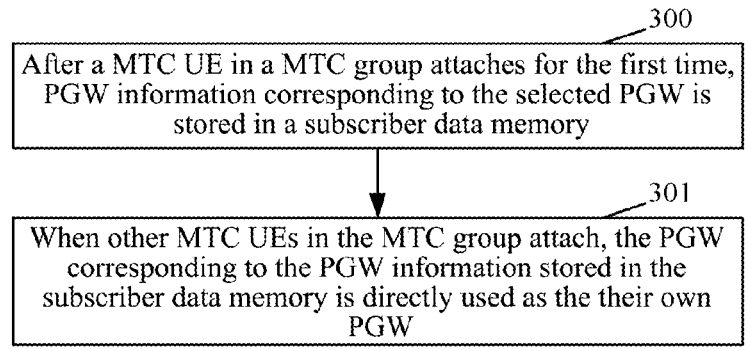
FIG. 3 is a flow diagram of method for a MTC group selecting a packet data network gateway according to the present invention.

FIG. 3 is a flow diagram of method for a MTC group selecting a packet data network gateway according to the present invention, and as shown in FIG. 3, following steps are included.

In step 300, after a MTC UE in the MTC group attaches for the first time, PGW information corresponding to the selected PGW is stored in a subscriber database.

The PGW information can be an IP address of PGW or a PGW identifier.

In step 301, when other MTC UEs in the MTC group attach, the PGW corresponding to the PGW information stored in the subscriber database is directly used as the their own PGWs.

In the step, a mobility management network element does not perform selection of the PGW in the attachment process of said other MTC UEs in the MTC group any more.

In the method of the present invention, the mobility management network element is a MME in an EPS network and is a Serving General Packet Radio Service (GPRS) Support Node (SGSN) in a GPRS network; the subscriber database is a HSS in the EPS network and is a Home Location Register (HLR) in the GPRS network.

With the method of the present invention, it is guaranteed that the PGWs selected by multiple MTC UEs belonging to the same MTC group are the same PGW, thereby guaranteeing that the maximum flow and charging of each MTC group are effectively limited subsequently.

In order to implement the method of the present invention, a mobility management network element is also provided and configured to: select a PGW in a first attachment of a MTC UE in a MTC group, and use PGW information corresponding to the selected PGW as group PGW information of the MTC group to which the MTC UE attaching for the first time belongs, and send to a subscriber database; when other MTC UEs in the MTC group attach, use the PGW corresponding to the group PGW information from the subscriber database directly as the PGW of said other MTC UEs in the MTC group.

Figure 4:
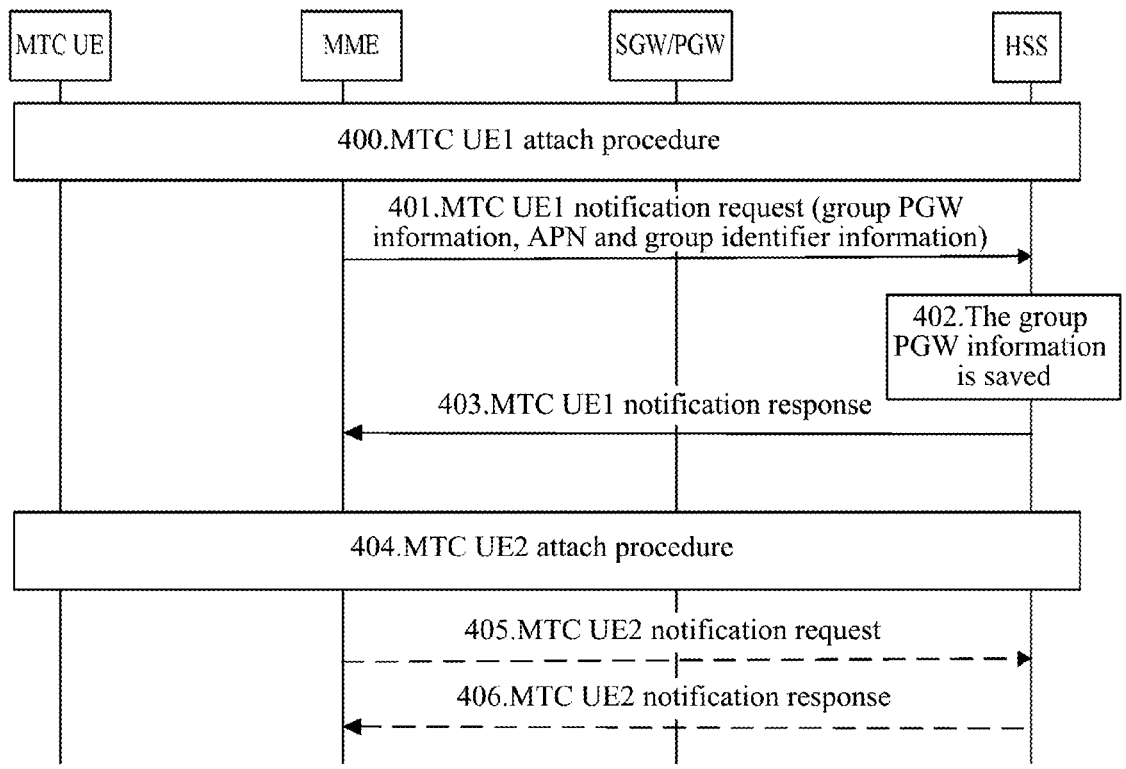
FIG. 4 is a flow diagram of the first example for a MTC group selecting a packet data network gateway according to the present invention.

In the present invention, the mobility management network element is further configured to: receive subscription information from the subscriber database, when determining that the group PGW information is changed and determining an affected bearer of the corresponding PGW, send a notification message to the PGW, including an affected bearer identifier in the notification message. Here, whether the group PGW information is changed can be determined according to group subscription data downloaded from the subscriber database and group subscription data saved locally. FIG. 4 is a flow diagram of the first example for a MTC group selecting a packet data network gateway according to the present invention. In the first example, it is assumed that a MTC UE1 and a MTC UE2 are terminal devices belonging to the same MTC group in an EPS, therefore, the MTC UE1 and MTC UE2 have identical group identifier information. It is assumed that the MTC UE1 is the first MTC UE in the MTC group which attaches to the network, when the MTC UE2 and other subsequent MTC UEs in the MTC group initiate the attachments, the subscriber database transfers the stored group PGW information corresponding to the MTC group to the MTC UE2 and other subsequent MTC UEs in the MTC group through an Update location response, moreover, the MTC UE2 and other subsequent MTC UEs in the MTC group will not inform the subscriber database of the group PGW information through the notification message any more. The group identifier information of the MTC UE1 and MTC UE2 belonging to the same group is checked in a MME. As shown in FIG. 4, the specific flow includes following steps.

In step 400, an attachment procedure of the MTC UE1.

In step 401, when checking that an attach request initiated by the MTC UE1 is the first attachment of the terminal devices in the MTC group, the MME sends a MTC UE1 notification message to a HSS, and PGW information corresponding to the PGW selected by the MTC UE1 in the attachment process is included in the MTC UE1 notification message to serve as group PGW information of the MTC group to which the MTC UE1 belongs. Furthermore, APN information and group identifier information and so on also can be included in the MTC UE1 notification message.

In this step, when a MTC device attaches to the mobility management network element each time, the mobility management network element will have a corresponding record. The mobility management network element can know whether there is an intra-group device to attach before the current network element according to a GROUP ID, and if no, the attach request this time is the first attachment of the terminal device in the MTC group.

In step 402, the HSS stores the group PGW information included in the MTC UE1 notification message.

In step 403, the HSS sends a MTC UE1 notification response to the MME.

In step 404, the MTC UE2 in the same MTC group initiates the attachment procedure.

In step 405, when checking that the MTC UE2 is not the first attachment in the MTC group, the MME does not send a notification message to the HSS. At this time, the notification message is an alternative message which appears in a handover scenario in the related art, and if the notification message is not sent, step 406 is omitted, that is to say, the notification message is mandatory when the UE1 attaches and it is alternative when the UE2 attaches, which is only used in the handover scenario in the related art, otherwise it is unnecessary to be sent.

Figure 5:
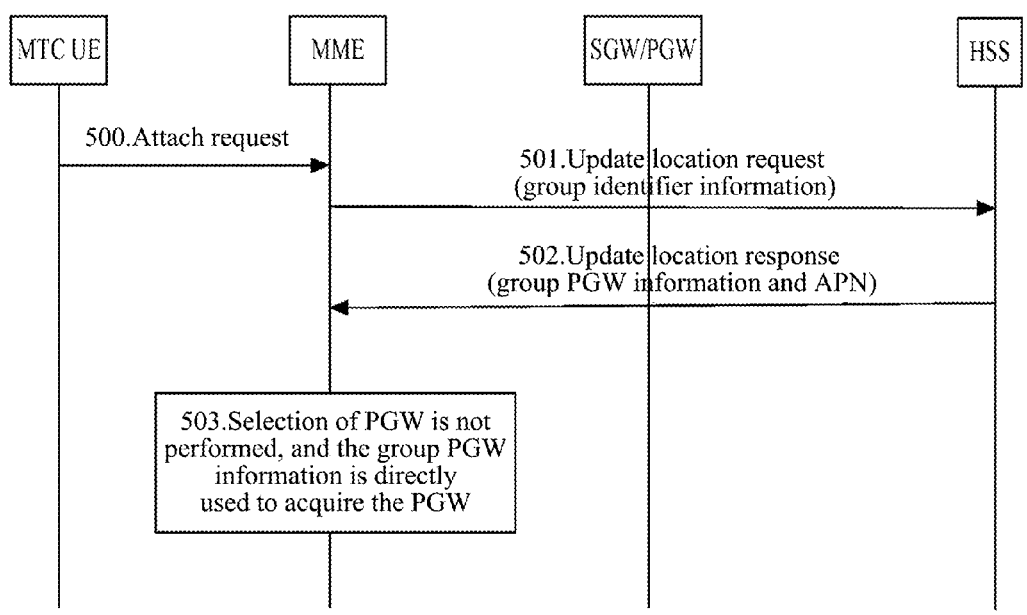
FIG. 5 is a flow diagram of a MTC UE2 initiating attachment in the first example of the present invention.

FIG. 5 is a flow diagram of the MTC UE2 initiating the attachment in the first example of the present invention. It is assumed that the MTC UE2 acquires the group PGW information, which is stored by the MTC UE1 in the HSS through the MME after the attachment procedure, through a location update message in the attachment procedure, and the MTC UE2 does not perform selection of the PGW in the subsequent attachment procedure. As shown in FIG. 5, following steps are specifically included.

In step 500, the MTC device sends the attach request to the MME.

In step 501, the MME sends an Update location request to the HSS, and includes the group identifier information of the MTC group to which the MTC UE2 belongs in the Update location request. It should be noted that, the group identifier information is alternative, and if the group identifier information is not included, the HSS is responsible for explaining the group identifier information of the MTC group to which the MTC UE2 belongs.

Since the subscriber database has a subscription home group of the MTC device, the group identifier information of the MTC group can be explained according to the information. Therefore, in the step, the HSS can know the GROUP ID to which the UE2 belongs according to the subscription information.

In step 502, the HSS sends an Update location response message to the MME, and includes the group PGW information of the MTC group to which the MTC UE2 belongs stored by the HSS itself in the Update location response message, and the APN information can be further included.

In step 503, after obtaining the group PGW information of the MTC group to which the MTC UE2 belongs, the MME does not perform selection of the PGW for the MTC UE2 any more, and the PGW corresponding to the obtained group PGW information of the MTC group to which the MTC UE2 belongs is directly used as the PGW of the current MTC UE2.

Figure 6:
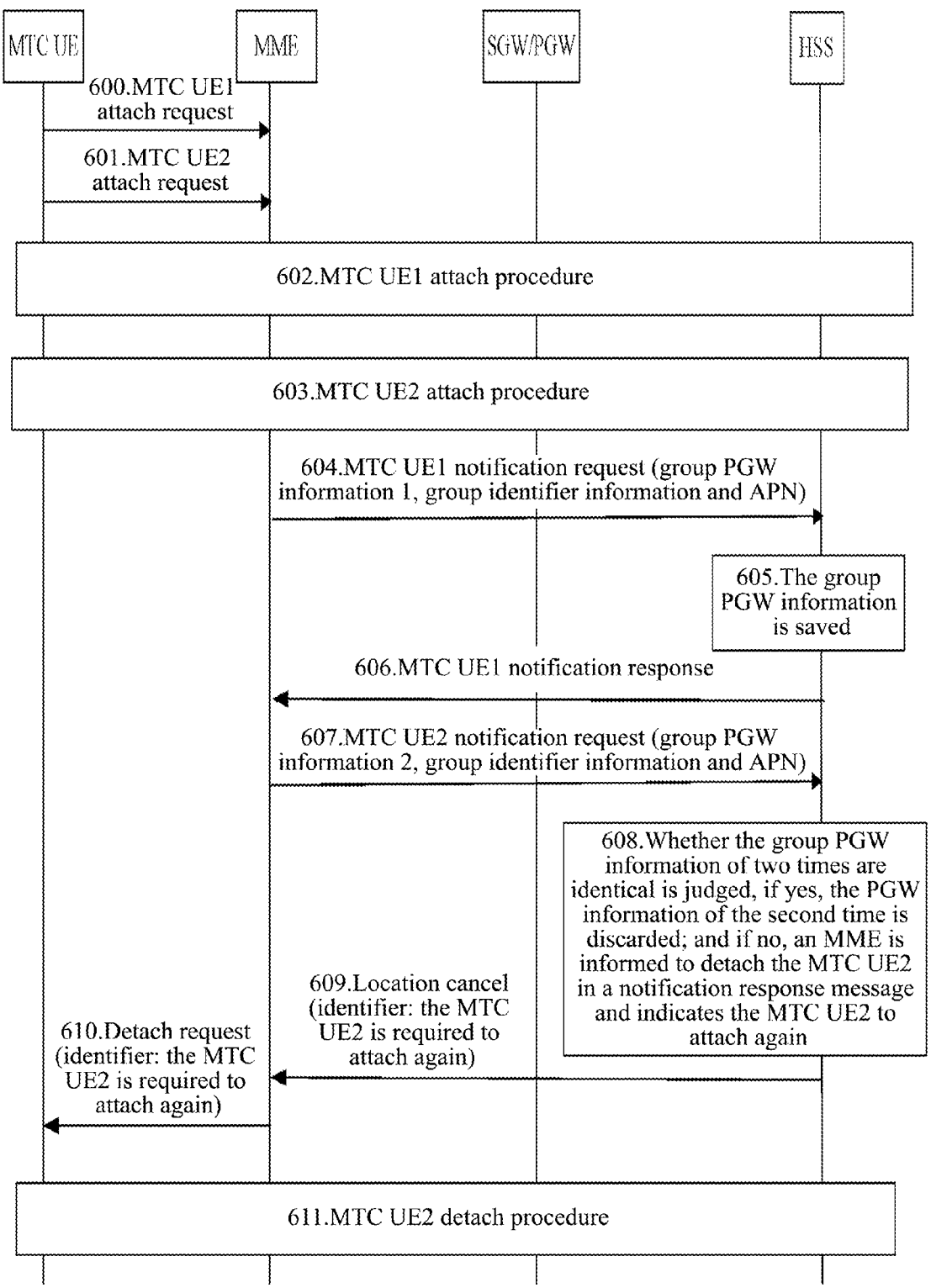
FIG. 6 is a flow diagram of the second example for a MTC group selecting a packet data network gateway according to the present invention.

FIG. 6 is a flow diagram of the second example for a MTC group selecting a packet data network gateway according to the present invention. In the second example, different MTC UEs in the same MTC group attach to the network simultaneously, and a subscriber database is responsible for processing the conflict problem that terminal devices in the MTC group are in a simultaneous attachment. It is assumed that MTC UE1 and MTC UE2 are the terminal devices belonging to the same MTC group in an EPS and they have identical group identifier information. As shown in FIG. 6, following steps are specifically included.

In step 600, the MTC UE1 sends an attach request to a MME.

In step 601, the MTC UE2 sends an attach request to the MME.

In step 602, an attachment procedure of the MTC UE1.

In step 603, an attachment procedure of the MTC UE2.

In step 604, the MME sends a MTC UE1 notification request to a HSS, and includes PGW information 1 corresponding to PGW1 selected by the MTC UE1 in the attachment in the MTC UE1 notification request to serve as group PGW information 1 of the MTC group to which the MTC UE1 belongs. Furthermore, APN and group identifier information and so on also can be included in a MTC UE1 notification message.

In step 605, the HSS stores the group PGW information 1 included in the MTC UE1 notification request.

In step 606, the HSS sends a MTC UE1 notification response to the MME.

In step 607, the MME sends a MTC UE2 notification request to the HSS, and includes PGW information 2 corresponding to PGW2 selected by the MTC UE2 in the attachment in the MTC UE2 notification request to serve as group PGW information 2 of the MTC group to which the MTC UE2 belongs. Furthermore, APN and group identifier information and so on also can be included in a MTC UE2 notification message.

In step 608, the HSS judges whether the group PGW information of two times are identical, if yes, the PGW information of the second time namely the group PGW information 2 is discarded, and the HSS sends a notification message response message to the MME, and the current procedure ends; if no, proceed to step 609.

In step 609, the HSS sends a Cancel location message to the MME, and includes identifier information used for indicating that the MTC UE2 is required to attach again in the Cancel location message.

In step 610, the MME sends a detach request message to the MTC UE2 according to an identifier information indication, and includes the identifier information used for indicating that the MTC UE2 is required to attach again in the detach request message.

In step 611, a detachment procedure of the MTC UE2.

The MTC UE2 initiates an attachment process again according to the identifier information subsequently.

Figure 7:
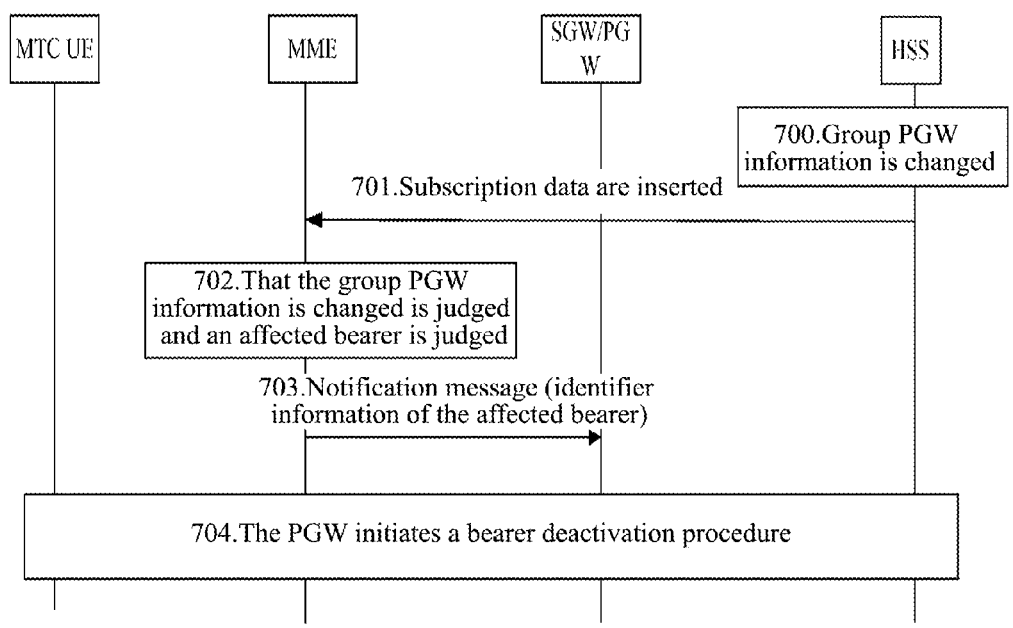
FIG. 7 is a flow diagram of PGW information update in the MTC group according to the present invention.

When the PGW information is changed, for example, when the subscriber database updates the group PGW information based on the operation willing, the method of the present invention further includes: the MME informing the PGW of an affected bearer identifier, and the PGW deactivating the corresponding bearer. FIG. 7 is a flow diagram of updating the PGW information in the MTC group according to the present invention, and as shown in FIG. 7, following steps are included.

In step 700, the group PGW information is changed.

In step 701, an HSS inserting subscription data of the device to an MME.

In step 702, the MME determines that the group PGW information is changed and determines an affected bearer of the corresponding PGW. In the step, whether the group PGW information is changed can be determined according to group subscription data downloaded from the HSS and group subscription data saved locally.

In step 703, the MME sends a notification message to the PGW, including the affected bearer identifier into the notification message.

In step 704, the PGW initiates a deactivation procedure to the affected bearer.

The above description is only the preferred examples of the present invention, which is not used to limit the protection scope of the present invention. All the modifications, equivalent substitutions, and improvements and so on made within the spirit and principle of the present invention shall fall into the protection scope of the present invention.

What is claimed is:

1. A method for a Machine Type Communication (MTC) group selecting a packet data network gateway (PGW) comprising:
   after a MTC UE in the MTC group attaches for the first time, taking PGW information corresponding to a selected PGW as group PGW information of the MTC group to be stored in a subscriber database;
   when other MTC UEs in the MTC group attach, directly using the PGW corresponding to the PGW information stored in the subscriber database as their own PGW;
   wherein, the PGW information comprises PGW IP address or PGW ID, and the step of taking PGW information corresponding to a selected PGW as group PGW information of the MTC group to be stored in a subscriber database comprises storing a mapping between the PGW information and the MTC group in the subscriber database,
   wherein when two or more than two MTC UEs initiate first attachments simultaneously in the MTC group, the method further comprises:
   the subscriber database judging whether the group PGW information obtained by MTC UEs initiating the first attachments simultaneously is identical, if yes, discarding remaining PGW information except PGW information obtained for the first time, the subscriber database sending a notification response message to a mobility management network element, and this procedure ending;
   if no, the subscriber database sending a Cancel location message to the mobility management network element, the Cancel location message including identifier information used for indicating that remaining MTC UEs initiating the first attachments simultaneously except the MTC UE obtaining the PGW information for the first time are required to attach again; according to a received identifier information indication, the mobility management network element sending detach request messages to the remaining MTC UEs initiating the first attachments simultaneously, and including identifier information used for indicating that the remaining MTC UEs initiating the first attachments simultaneously are required to attach again in the detach request message; and the remaining MTC UEs initiating the first attachments simultaneously executing detachment and initiating an attachment process again according to the identifier information.

2. The method according to claim 1, wherein before storing the PGW information corresponding to the selected PGW in the subscriber database, the method further comprises:
   the mobility management network element checking that an attach request initiated by the MTC UE is a first attachment in the MTC group.

3. The method according to claim 2, wherein, storing the PGW information corresponding to the selected PGW in the subscriber database comprises:
   the mobility management network element sending a notification message including the PGW information corresponding to the selected PGW to the subscriber database;
   the subscriber database taking the received PGW information corresponding to the selected PGW as the group PGW information of the MTC group to be stored locally.

4. The method according to claim 3, wherein, the notification message further includes Access Point Name (APN) information and group identifier information.

5. The method according to claim 1, wherein, before using the PGW corresponding to the PGW information stored in the subscriber database as their own PGW, the method further comprises:
   the mobility management network element checking that attach requests initiated by said other MTC UEs are not first attachments in the MTC group.

6. The method according to claim 5, wherein, using the PGW corresponding to the PGW information stored in the subscriber database as their own PGW comprises:
   in an attachment process of said other MTC UEs in the MTC group, the mobility management network element sending an Update location request to the subscriber database;
   the subscriber database sending an Update location response message to the mobility management network element, and including the group PGW information of the MTC group stored by the subscriber database in the Update location response message; and
   after obtaining the group PGW information of the MTC group, the mobility management network element not selecting the PGW for said other MTC UEs any more, and using the PGW corresponding to the obtained group PGW information of the MTC group as the PGW of said other MTC UEs directly.

7. The method according to claim 6, wherein, the Update location request includes group identifier information of the MTC group; or,
   the Update location request does not include the group identifier information of the MTC group, and the method further comprises: the subscriber database explaining the group identifier information of the MTC group.

8. The method according to claim 6, wherein, the Update location response message further includes APN information.

9. The method according to claim 1, wherein when the stored group PGW information is changed, the method further comprises:
the mobility management network element informing the PGW corresponding to the group PGW information of an affected bearer identifier, and the PGW deactivating a corresponding bearer.

10. The method according to claim 9, wherein, the mobility management network element informing the PGW corresponding to the group PGW information of the affected bearer identifier, and the PGW deactivating the corresponding bearer specifically comprises:
the subscriber database inserting subscription data into the mobility management network element;
when the mobility management network element determines that the group PGW information is changed and determines an affected bearer of a corresponding PGW, sending a notification message to the PGW corresponding to the group PGW information, and including the affected bearer identifier in the notification message; and
the PGW corresponding to the group PGW information initiating a deactivation procedure for the affected bearer.

11. The method according to claim 1, wherein, the PGW information is an IP address of PGW or a PGW identifier.

12. The method according to claim 2, wherein, in an Evolved Packet System (EPS) network, the mobility management network element is a Mobility Management Entity (MME), and the subscriber database is a Home Subscriber Server (HSS);
in a GPRS network, the mobility management network element is a Serving General Packet Radio Service (GPRS) Support Node (SGSN), and the subscriber database is a Home Location Register (HLR).

13. A mobility management network element, comprising:
a processor; and
a storage device for storing processor executable instructions that when executed by the processor cause the processor to perform the following steps:
selecting a packet data network gateway (PGW) in a first attachment of a MTC UE in a Machine Type Communication (MTC) group, and taking PGW information corresponding to the selected PGW as group PGW information of the MTC group to which the MTC UE attaching for the first time belongs, and sending to a subscriber database;
when other MTC UEs in the MTC group attach, using the PGW corresponding to the group PGW information from the subscriber database directly as the PGW of said other MTC UEs in the MTC group;
wherein, the PGW information comprises PGW IP address or PGW ID, and the step of taking PGW information corresponding to a selected PGW as group PGW information of the MTC group to which the MTC UE attaching for the first time belongs and send to a subscriber database comprises: storing a mapping between the PGW information and the MTC group in the subscriber database;
when two or more than two MTC UEs initiate first attachments simultaneously in the MTC group:
if the group PGW information obtained by MTC UEs initiating the first attachments simultaneously is identical, receiving a notification response message from the subscriber database and ending this procedure;
if the group PGW information obtained by MTC UEs initiating the first attachments simultaneously is not identical, receiving a Cancel location message from the subscriber database including identifier information used for indicating that remaining MTC UEs initiating the first attachments simultaneously except the MTC UE obtaining the PGW information for the first time are required to attach again; and according to a received identifier information indication, sending detach request messages to the remaining MTC UEs initiating the first attachments simultaneously, and including identifier information used for indicating that the remaining MTC UEs initiating the first attachments simultaneously are required to attach again in the detach request message, thus making the remaining MTC UEs initiating the first attachments simultaneously execute detachment and initiate an attachment process again according to the identifier information.

14. The mobility management network element according to claim 13, wherein the processor is further caused to:
receive subscription information from the subscriber database, when determining that the group PGW information is changed and determining an affected bearer of a corresponding PGW, and send a notification message to the PGW, including an affected bearer identifier in the notification message.

15. The mobility management network element according to claim 13, wherein, in an EPS network, the mobility management network element is a MME;
in a GPRS network, the mobility management network element is a SGSN.

16. The method according to claim 5, wherein, in an Evolved Packet System (EPS) network, the mobility management network element is a Mobility Management Entity (MME), and the subscriber database is a Home Subscriber Server (HSS);
in a GPRS network, the mobility management network element is a Serving General Packet Radio Service (GPRS) Support Node (SGSN), and the subscriber database is a Home Location Register (HLR).

17. The method according to claim 9, wherein, in an Evolved Packet System (EPS) network, the mobility management network element is a Mobility Management Entity (MME), and the subscriber database is a Home Subscriber Server (HSS);
in a GPRS network, the mobility management network element is a Serving General Packet Radio Service (GPRS) Support Node (SGSN), and the subscriber database is a Home Location Register (HLR).

18. The mobility management network element according to claim 14, wherein, in an EPS network, the mobility management network element is a MME;
in a GPRS network, the mobility management network element is a SGSN.

* * * * *